US007690995B2

(12) United States Patent
Frankulin et al.

(10) Patent No.: US 7,690,995 B2
(45) Date of Patent: Apr. 6, 2010

(54) PAGING SYSTEM AND LOCATION VERIFICATION FOR REMOTE ACCESS TO WAGERING SYSTEMS

(75) Inventors: Ray Frankulin, Henderson, NV (US); Stan Jones, Las Vegas, NV (US)

(73) Assignee: Station Casinos, Inc., Las Vegas, NV (US)

( * ) Notice: Subject to any disclaimer, the term of this patent is extended or adjusted under 35 U.S.C. 154(b) by 1976 days.

(21) Appl. No.: 09/939,233

(22) Filed: Aug. 24, 2001

(65) Prior Publication Data

US 2002/0025851 A1 Feb. 28, 2002

Related U.S. Application Data

(60) Provisional application No. 60/228,736, filed on Aug. 28, 2000.

(51) Int. Cl.
*A63F 13/00* (2006.01)

(52) U.S. Cl. ............................ 463/41; 463/25; 463/29; 463/40; 463/42

(58) Field of Classification Search ............ 463/40–42, 463/29, 25
See application file for complete search history.

(56) References Cited

U.S. PATENT DOCUMENTS 5,618,232 A * 4/1997 Martin ........................ 463/25
5,787,173 A * 7/1998 Seheidt et al. ................ 380/21
5,921,865 A * 7/1999 Scagnelli et al. .............. 463/17
5,999,808 A * 12/1999 LaDue ....................... 455/412
6,011,485 A * 1/2000 Wicks ................... 340/825.44
6,104,815 A * 8/2000 Alcorn et al. ............... 380/251
6,508,710 B1 * 1/2003 Paravia et al. ................. 463/42

* cited by examiner

*Primary Examiner*—James S McClellan
(74) *Attorney, Agent, or Firm*—Townsend and Townsend and Crew, LLP

(57) ABSTRACT

A verification system for verifying a user's location within a predefined geographic area to allow remote access to a sports book system. The system includes a transmitter; one or more pagers for communicating with the transmitter; a control center for receiving a telephone call requesting remote access to a betting system; upon receipt of the telephone call, the control center forwards an authorization number to the transmitter which forwards the authorization number to the user pager. The user pager receives the authorization number only when within the predefined geographical area. Also, the system includes a communication channel by which the user returns to the control center, the authorization number after receipt by the user pager. Upon receiving the authorization number, the control center allows the user to remotely access the betting system.

17 Claims, 3 Drawing Sheets

PAGING SYSTEM AND LOCATION VERIFICATION FOR REMOTE ACCESS TO WAGERING SYSTEMS

CROSS REFERENCE TO RELATED APPLICATIONS

The present application claims priority from co-pending U.S. Provisional Patent Application No. 60/228,736 filed Aug. 28, 2000 entitled SPORTS BOOK PAGING SYSTEM which is hereby incorporated by reference, as if set forth in full in this document, for all purposes.

BACKGROUND OF THE INVENTION

The present invention relates generally to the field of gaming systems and more specifically to system for user authentication for verifying that a gambler is located within a geographical area in order to allow remote access to a casino betting system.

Conventional systems for user authentication are generally well known. A user authentication system verifies whether a person or device attempting to access or perform a transaction with a host computer system is a person or device entitled to access, most host computer systems require the person or device to provide information confirming identity.

Conventional user authentication techniques have been based on, for example, on requesting information the user knows, an object the user possesses, and a personal characteristics, the most common being information known only to the user. Examples of such information include passwords (or pass-phrases) and personal identification numbers (PINS). Cryptographic methods for authentication (including one-time passwords and challenge response protocols) also fall into this category when implemented in software or hardware. Here, the information possessed by the user is either a code key, or more likely, a PIN or password that provides access to the key (which is typically a user unfriendly random bit stream). For example, the keys used with Pretty Good Privacy (PGP) are stored in files encrypted under user-selected pass phrases.

Examples of authentication using objects the user possesses include access tokens, physical keys, smart cards, PCMCIA cards and other hardware devices, including cryptographic devices and one-time password generators. Dial-back mechanisms also fall within this category. With dial back mechanisms, the possessed object is a phone line with a specific number. Cryptographic devices are typically used with PINs to control activation of the devices. For example, the Fortezze PCMCIA cryptographic card requires a 4-digit PIN for activation.

Examples of personal characteristics include biometric characteristics including finger and thumb prints, hand geometry, voice prints, retinal scans and keystroke patterns. Handwritten signatures fall into this category, although they might also be used viewed as based on information the user knows.

One conventional technique utilizes the client's geodetic location (latitude, longitude and height) as the basis for initial registration of the client and for subsequent log-in authorizations for access to a host computer network or other protected enclave. Disadvantageously, such conventional user authentication techniques do not allow or provide for authorization when such authorization is based upon the client's location within a predefined geographical area in order to remotely access a sports book. More specifically, this issue arises gambling geographical areas such as the State of Nevada. Many Nevada casinos include sports books where gamblers may place bets on various sporting events and other types of events. Many sports books allow gamblers to place bets via telephones. However, the laws generally require the telephone calls to be made within the legal jurisdiction of the casino.

Recently, the Nevada Gaming Control Board mandated that all new and existing systems must now include a method for ensuring that all telephone wagers take place within the state of Nevada. Telephone-only based systems for allowing the placement of bets is no option since such system cannot determine the location of the user. Even if the location of users can be determined, it is relatively easy to defeat such systems. In addition, the aforementioned authentication methods generally will not be helpful in ensuring that the gambler is placing a telephone call from within the state of Nevada.

Therefore there is a need to resolve the aforementioned disadvantages of conventional authentication systems particularly with regard to remote access to gambling systems and the present invention meets this need.

SUMMARY OF THE INVENTION

Various aspects of the present invention can be found in a method of verifying a user's location within a predefined geographic area to allow remote access to wagering system such as a sports book system. According to a first aspect of the present invention, the method includes defining the area and providing a pager to the user that only works within the area. A control center is contacted by the user and then generates a verification number. The control system then contacts the pager, and provides the verification number to the user via the pager. The user then inputs the verification number to the control center, which then provides access to the system to the user.

According to an alternate aspect of the present invention, a method employing a location verifier system for verifying that a user is located within a predefined geographical area, after which the user is allowed to place a telephone wager on a sports book is disclosed. The method includes the following: (1) receiving by the location verifier system, a telephone call from the user requesting access to the sports book; (2) forwarding a verification number to the user, the verification number being received by the user only if the user is located within the predefined geographical area; (3) receiving the verification number from the user; (4) verifying the verification number forwarded is the same verification number received; and (5) permitting the user to place the telephone wager on the sports book.

According to another aspect of the present invention, a verification system is taught. Among other components, the system includes: (1) a transmitting system having one or more transmitters; (2) a paging system having one or more pagers for communicating with the transmitting system; (3) a control system for receiving a signal requesting remote access to a betting system; (4) upon receipt of the signal, the control system forwards an authorization number to the transmitting system; (5) the transmitting system forwarding the authorization number to the user pager; (7) the user pager being capable of receiving the authorization number only when within the predefined geographical area; and (8) a communication channel for returning the authorization number to the control system after receipt by the user pager, such the control system allows remote access to the betting system after the authorization number is received.

According to another aspect of the present invention, a method used by a location verifier system for verifying a user's location within an area to enable remote access to a betting system is disclosed. Among other acts, the method includes the following: (1) receiving a signal for requesting access to the betting system; (2) randomly generating a verification number responsive to the signal; (3) forwarding the verification number such that the verification number travels no further than a predefined geographic location; (4) receiving the verification number; and (5) if the verification number forwarded is the same as the verification number received, allowing remote access to the betting system.

According to another aspect of the present invention, a method of verifying a user's location within an area to allow remote access to a gambling system is taught. The method includes the following: (1) providing a pager to the user, the pager being operable only within a predefined geographical area; (2) communicating by the user, with a control center when the user desires to remotely access the gambling system; (3) generating by the control center, a number for verifying that the user is within the predefined geographical area; (4) forwarding by the control center, the number to the pager, the pager receiving the number only when within the predefined geographical area; (5) forwarding by the user, the verification number to the control center; and (6) providing remote access to the gambling system so that the user may remotely place wagers on the gambling system.

According to another aspect of the present invention, access to the system is via a computer in communication with a wide area network, such as the Internet.

A further understanding of the nature and advantages of the present invention herein may be realized by reference to the remaining portions of the specification and the attached drawings. Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings. In the drawings, the same reference numbers indicate identical or functionally similar elements.

DETAILED DESCRIPTION OF THE INVENTION

Briefly, according to a first aspect of the present invention, a system for verifying a user's location within a geographical area to permit access to a betting system is schematically illustrated. A geographical area is defined, and a pager that only works within the area is provided. A control center is contacted when the user wishes to access the betting system after which a verification number is generated. The control system contacts the pager, and provides the verification number to the user via the pager. The user then inputs the verification number to the control center, which then provides access to the system to the user.

Figure 1:
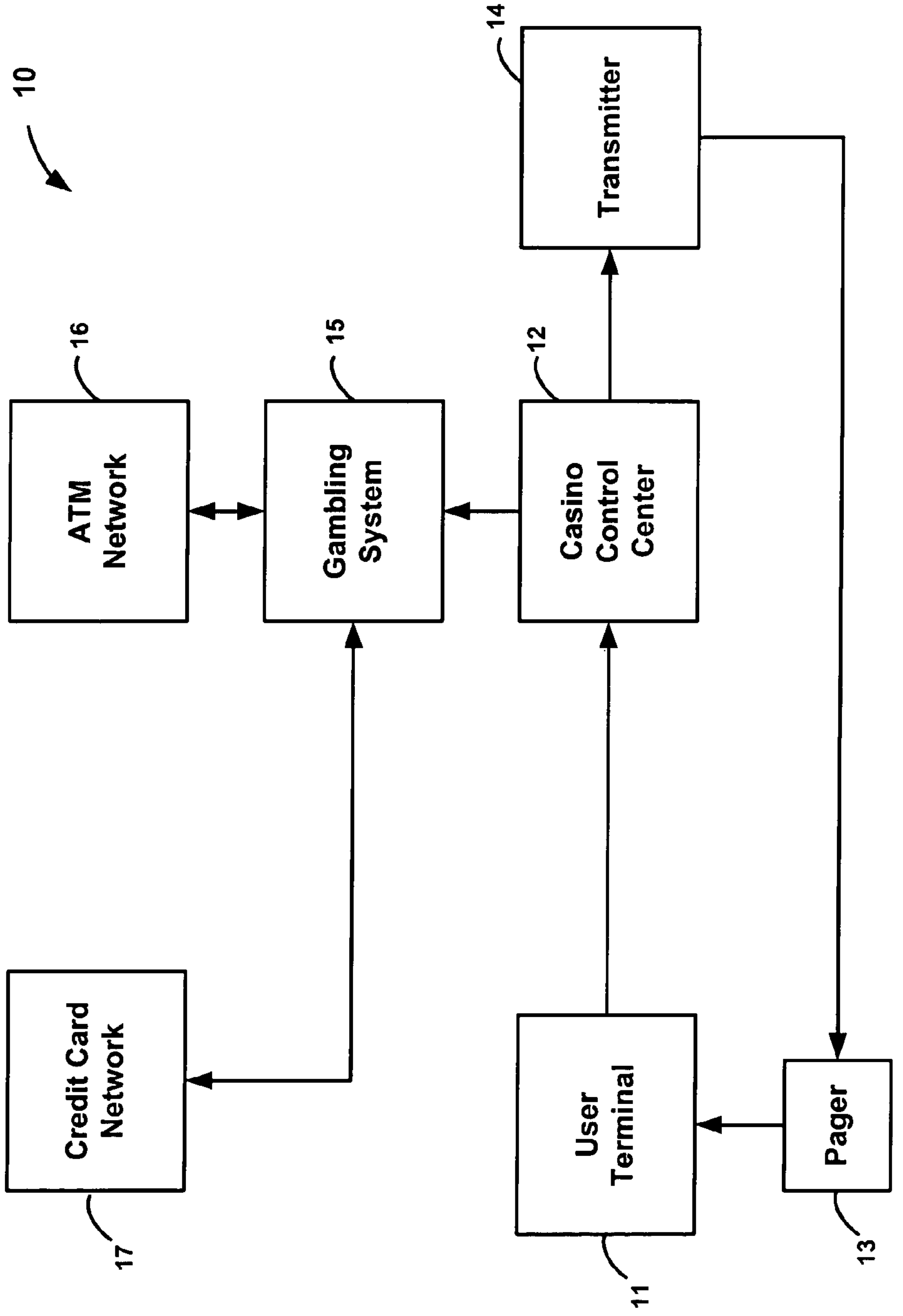
FIG. 1 is block diagram of a system for verifying a user's location within a geographical area to permit access to a betting system in accordance with a first embodiment of the present invention.

FIG. 1 is block diagram of a system 10 for verifying a user's location within a geographical area to permit access to a betting system. The example illustrated in FIG. 1 is with regard to a casino sports book off-site betting system. However, those skilled in the art will understand that a system in accordance with the present invention may be used for other purposes.

Among other components, system 10 comprises a user terminal 11, for example, a telephone or computer in communication with a casino control center 12. The system further includes at least one pager 13 for use by the user and at least one transmitter 14 for contacting the pager.

In use, a user, in this example a gambler, will contact the casino's control center from user terminal 11. This contact may be by placing a telephone call or with a call by a computer over a wide area network such as the Internet or Intranet. Upon being contacted by the user, casino control center 12 will generate a verification or authorization number, preferably with a random number generator. The control center will then contact pager 13 via transmitter 14 and will provide the verification number to the user via the pager. The user will then input the verification number to the control center either over a telephone or with a computer or two-way radio system. Upon receiving the verification number, the control center will provide access to the casino's off-site gambling system 15, thus allowing the user to place a bet. Although not shown, the casino control center 12 may be a computer system incorporated with gambling system 15.

According to one embodiment of the present invention, the pagers provided to the user will only function within a predefined area, for example, the State of Nevada. This limiting of service may be provided by limiting the transmitting power of the transceiver or in conjunction with a Global Positioning System (GPS) sensor. In this example, this will allow for ensuring that the gambler is indeed within the State of Nevada if he wishes to place a bet remotely since if he is not in Nevada, he will not receive the page and therefore, he will not receive the verification number.

According to another embodiment of the present invention, gambling system 15 is in communication with an automated teller machine (ATM) network 16. This allows the gambler's wager to be paid from their bank account and/or to have any winnings paid directly into their bank account if desired. Additionally, a gambler may be allowed to place his wager with a credit card. Thus, preferably, gambling system 15 is also in communication with a standard credit card authorization network 17. Additionally, gamblers may be allowed to set up personal accounts for placing wagers and may be allowed to charge wagers to their room if they happen to be a hotel guest of the casino. Preferably, the gambler will have an account with the casino/hotel and will begin the access process by inputting his account number and PIN to the control center.

Figure 2:
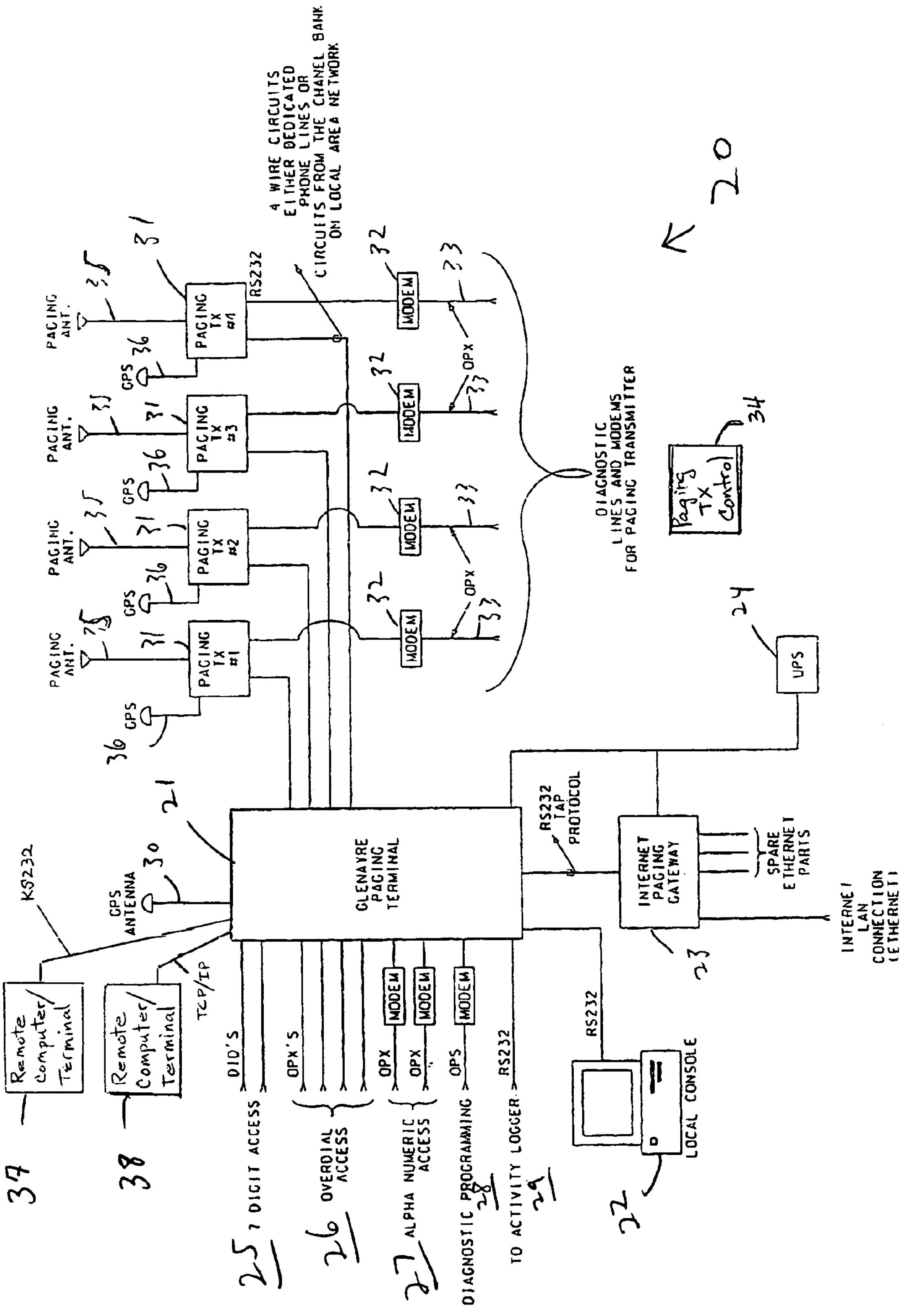
FIG. 2 is a block diagram of a paging system arrangement employed in the embodiment of FIG. 1.

FIG. 2 is a block diagram of a paging system arrangement 20 for authenticating the location of a user within a predefined geographical area to permit remote access to a betting system in accordance with a first embodiment of the present invention.

Among other components, paging system arrangement 20 comprises a paging terminal 21 that has a local computer console 22 coupled thereto for input. An Internet/intranet paging gateway 23 is also coupled to the paging terminal along with a UPS 24. A first interface 25 for permitting 7 digit access, a second interface 26 for enabling over dial access 26, and a third interface 27 permitting alphanumeric access are also provided to the paging terminal. The paging terminal also has diagnostic program input 28 and is coupled to an activity logger 29. A GPS antenna 30 is coupled to the paging terminal along with paging transmitters 31. In this example, four paging transmitters are provided and are coupled, via modems 32 and diagnostic lines 33, to the overall paging transmitter control 34. Each transmitter includes a paging antenna 35 and preferably a GPS sensor 36 for verifying the location of the pager. Remote computer or terminal 37 is connected to the paging terminal via RS232 using a computer protocol for input; remote computer or terminal 38 is connected to the paging terminal via TCP/IP using a computer protocol for inputs.

Examples of specific components for use in the system illustrated in FIG. 2 include a Glenayre GL3 000ES paging terminal, a Hark internet/intranet paging gateway, GL-T 8000 paging transmitters and a variety of pagers preferably operating on a optimal frequency channel. Preferably, the system will utilize an optimal number of transmitter sites to provide strong coverage throughout the designated area with excellent penetration into buildings. Preferably, the paging terminal and Internet/intranet paging gateway are co-located in a centralized location. Preferably, the interface to the paging gateway is an Internet connection to a high-speed ATM network. Preferably, the remote interface to the paging terminal is a pc using TCP/IP connected to a high speed network.

According to one embodiment of the present invention, a system of transmitters in communication with a control system that allows for pages to be sent from an in-house developed betting system to gamblers wishing to place bets while ensuring that they are geographically located within a predefined area is provided. In a first aspect, a gambler simply calls the system and enters his account and PIN information. A page is then sent to the gambler with a randomly generated verification number. The gambler enters this number and gains access to the rest of the betting system.

Figure 3:
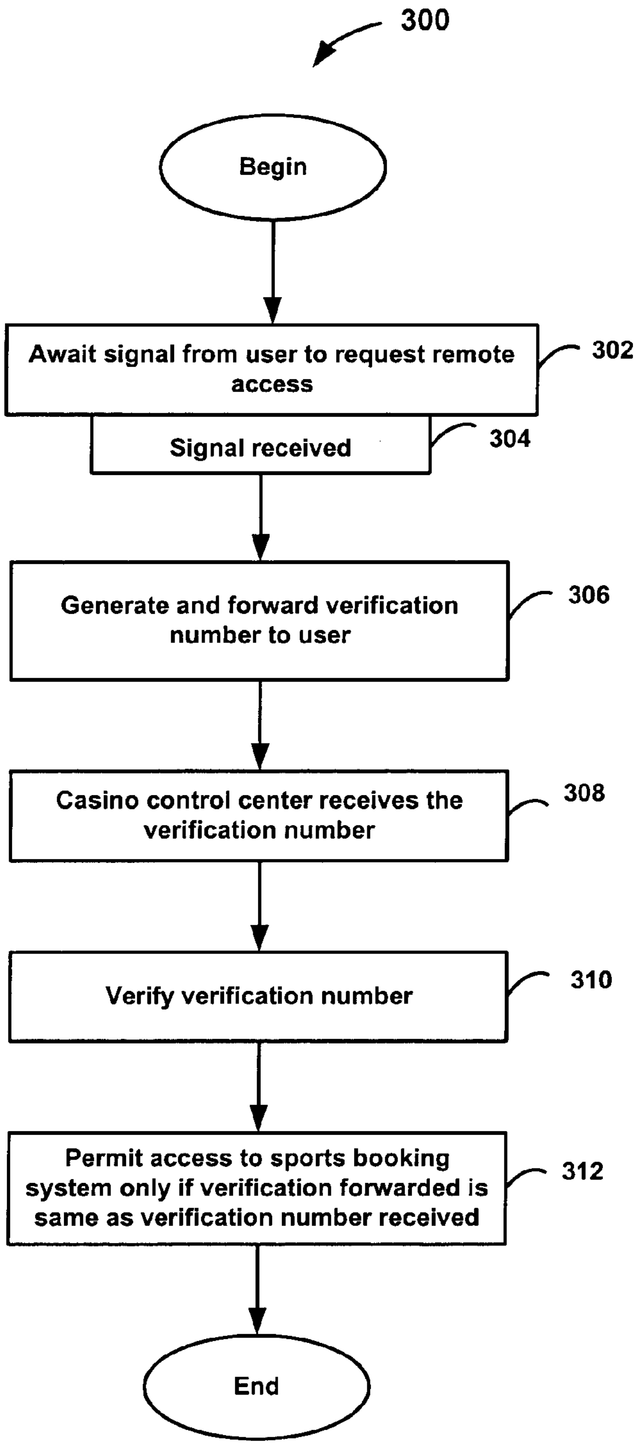
FIG. 3 is a flow chart of a method for verifying that a user is located within a predefined geographical area, after which the user is allowed to place a telephone wager on a sports book in accordance with one embodiment of the present invention.

FIG. 3 is a flow chart of a method 300 for verifying that a user is located within a predefined geographical area, after which the user is allowed to place a telephone wager on a sports book according to one embodiment of the present invention. Method 300 employs a location verifier system as shown in FIG. 1 comprising user terminal 11, casino control center 12, transmitter 14 and pager 13 among other components. One of ordinary skill in the art will realize that one or more of the aforementioned components may be a LAN wherein one or more components are computer systems. For example, casino control center 12 and user terminal 11 may be computing devices. In addition, while reference is being made to a sports book, the present invention is applicable to wagering and betting systems.

At block 302, method 300 comprises awaiting a signal requesting access to the sports book shown as gambling system 15 in FIG. 1. Specifically, casino control system 12 awaits a signal from the gambler to request access to gambling system 15.

At block 304, the signal is received. The signal may be a telephone call from user 11 requesting access to the sports book. Alternatively, the user may signal casino control system 12 via a modem. After the signal is received, casino control system 12 generates a verification number for the user. The verification number is typically generated using a random number generator or the like.

At block 306, method 300 involves forwarding the verification number to the user. It should be observed that the verification number is received by the user only if the user is located within the predefined geographical area. In order to receive the number, the user is provided with pager 13. If pager 13 is within the geographical area, it receives the verification number from transmitter 14. Otherwise, the verification number is not delivered to the user. One technique for ensuring the number is not received is to limit the transmitting power of transmitter 14 to the predefined geographical range. After the verification number is delivered to pager 13, the user forwards the number to casino control center 12.

At block 308, method 300 comprises receiving by the casino control center 12, the verification number from the user.

At block 310, the verification number is verified to ensure that the verification number forwarded is the same as the verification number received.

At block 312, upon verification, the user is allowed to place the telephone wager on the sports book.

In this fashion, the present invention teaches a paging system and location verification for allowing a gambler to remotely access to a wagering system such as a sports book. Although the invention has been described with reference to specific exemplary embodiments, it will appreciated that it is intended to cover all modifications and equivalents within the scope of the appended claims.

What is claimed is:

1. A method employing a location verifier system for verifying that a user is located within a predefined geographical area, after which the user is allowed to place a telephone wager on a sports book, the method comprising:

receiving by the location verifier system, a telephone call from the user requesting access to the sports book;

forwarding a verification number to the user, the verification number being received by the user only if the user is located within the predefined geographical area;

receiving the verification number from the user;

verifying the verification number forwarded is the same verification number received; and permitting the user to place the telephone wager on the sports book.

2. The method of claim 1 wherein forwarding the verification number further comprises forwarding the verification number to a user pager operable only within the predefined geographical area; and receiving the verification number further comprises receiving the verification number from the user after the verification number is retrieved from the user pager.

3. A verification system comprising:

a transmitting system having one or more transmitters;

one or more pagers for communicating with the transmitting system;

a control system for receiving a signal requesting remote access to a betting system;

upon receipt of the signal, the control system forwards an authorization number to the transmitting system;

the transmitting system forwarding the authorization number to the user pager;

the user pager being capable of receiving the authorization number only when within the predefined geographical area; and a communication channel for returning the authorization number to the control system after receipt by the user pager, such that the control system allows remote access to the betting system after the authorization number is received.

4. The system of claim 3 wherein the betting system is for allowing gamblers to place wagers on various sporting games and events.

5. The system of claim 3 wherein the control system is a casino control center.

6. The system of claim 3 further comprising wherein each user pager is assigned to a gambler.

7. The system of claim 3 wherein the transmitting system further comprises three transmitters each tactically placed relative to each other to cover the predefined geographic area.

8. The system of claim 3 wherein the signal is a telephone call.

9. The system of claim 3 further comprising a computer system communicably coupled to the communication channel for generating the signal and for returning the authorization number to the control system.

10. A method used by a location verifier system for verifying a user's location within an area to enable remote access to a betting system, the method comprising:

receiving a signal for requesting access to the betting system;

randomly generating a verification number responsive to the signal;

forwarding the verification number such that the verification number travels no further than a predefined geographic location;

receiving the verification number; and if the verification number forwarded is the seine as the verification number received, allowing remote access to the betting system.

11. The method of claim 10 wherein forwarding the verification number further comprises forwarding the verification number to a user pager, and receiving the verification number further comprises receiving the verification number from the user.

12. The method of claim 10 wherein forwarding the verification number further comprises forwarding the verification number such that a user or system located outside the predefined geographic area is unable to receive the verification number.

13. The meted of claim 10 wherein the signal is a telephone call from a user.

14. The method of claim 10 wherein the signal is sent via a computer and a modem.

15. A method of verifying a user's location within an area to allow remote access to a gambling system, to method comprising:

providing a pager to the user, the pager being operable only within a predefined geographical area;

communicating by the user, with a control center when the user desires to remotely access the gambling system;

generating by the control center, a number for verifying that the user is within the predefined geographical area;

forwarding by the control center, the number to the pager, the pager receiving the number only when within the predefined geographical area;

forwarding by the user, the verification number to the control center; and providing remote access to the gambling system so that the user may remotely place wagers on the gambling system.

16. The method of claim 15 wherein the gambling system is for placing wagers remotely.

17. The method of claim 15 wherein the number is a random number generated by a random number generator.

* * * * *